United States Patent

Noel

[11] 3,912,430
[45] Oct. 14, 1975

[54] APPARATUS FOR MOLDING BEADS EXPANDABLE AND FORMABLE UNDER HEAT AND PRESSURE

[76] Inventor: John A. Noel, 520 E. Medlock Drive, Phoenix, Ariz. 85012

[22] Filed: May 24, 1974

[21] Appl. No.: 473,100

[52] U.S. Cl............ 425/4 R; 249/63; 249/125; 249/161; 425/441; 425/468; 425/817 R
[51] Int. Cl.².............. B29C 1/14; B29D 27/04
[58] Field of Search........ 425/4 R, 817 R, 175, 176, 425/188, 441, 438, 443, 468; 249/122, 125, 129, 130, 160, 161, 173, 63, 64; 264/47, 50, 54, 51

[56] References Cited
UNITED STATES PATENTS

| | | | |
|---|---|---|---|
| 2,883,728 | 4/1959 | Sederlund | 249/125 X |
| 3,264,381 | 8/1966 | Stevens | 425/817 R X |
| 3,505,435 | 4/1970 | Schmidt | 425/4 R X |
| 3,537,131 | 11/1970 | Kracht et al. | 425/4 R |
| 3,663,670 | 5/1972 | Swayne et al. | 425/817 R X |
| 3,800,015 | 3/1974 | Sachs | 249/125 X |

Primary Examiner—Francis S. Husar
Assistant Examiner—Mark Rosenbaum

[57] ABSTRACT

Apparatus for molding material expandable and formable under heat and pressure comprising a first mold member which is hollow and open at one end and of uniform internal cross section along an axis perpendicular to the open end, a second mold member comprising a central element and end elements connected with the central element and spaced apart longitudinally of the central element, the external cross section of the end elements conforming to the uniform internal cross section of the first mold member so that when the second mold member is inserted into the first mold member through the open end of the first mold member a mold cavity is formed within the first mold member with the spaced apart end elements of the second mold member defining the ends of the mold cavity, means for introducing material expandable and formable under heat and pressure into the thus formed mold cavity, means for admitting to the mold cavity a medium for subjecting said material to heat and pressure to form in the mold cavity a product having the shape of the mold cavity and means for withdrawing the second mold member with said product from the first mold member through the open end thereof. The central element may be hollow and have transverse holes therein and means may be provided for introducing into the mold cavity through the central element and through the transverse holes therein the medium for subjecting the material in the mold cavity to heat and pressure. The central element may be formed so as to divide the mold cavity into a plurality of isolated portions extending longitudinally of the mold cavity between the end elements with means for introducing the material expandable and formable under heat and pressure into each of the isolated portions of the mold cavity to produce in each such portion a product having the shape thereof.

8 Claims, 13 Drawing Figures

LANDS TO CENTER MALE MOLD PART IN FEMALE MOLD PART

.004-.008 CLEARANCE GAPS OR VENTS BETWEEN END ELEMENTS 9 AND 10 AND CYLINDER 1 TO VENT INJECTING AIR AND COOKING MEDIUM PRIOR TO FUSION (GAPS SEAL OFF AS BEADS EXPAND AND FUSE)

PIPE INSULATION

CUSTOM SHAPES

CONTAINER

BLOCK OR BOARD

APPARATUS FOR MOLDING BEADS EXPANDABLE AND FORMABLE UNDER HEAT AND PRESSURE

This invention relates to a system of molding thermoplastic material or other material expandable and formable under heat and pressure to form products such as pipe insulation, boxes boards and blocks or shapes such as channels and angles. The preferred material used for molding is in the form of expandable beads such as beads of polystyrene containing an expanding or foaming agent. The beads may be pre-expanded as known to those skilled in the art. Such beads are introduced into a mold and subjected to heat or "cooked" under pressure to form the product being produced. The beads expand and consolidate in the form determined by the shape of the mold. The mold has a first mold member or female mold part and a cooperating second mold member or male mold part. A coolant may be introduced to cool the shaped and consolidated product after which the product is withdrawn along with the male mold part from the female mold part and then removed from the male mold part. The thermal sequence which is employed is conventional. The features of the molding system which contribute to the new and useful results obtained will be described below.

I provide apparatus for molding material expandable and formable under heat and pressure comprising a first mold member which is hollow and open at one end and of uniform internal cross section along an axis perpendicular to the open end, a second mold member comprising a central element and end elements connected with the central element and spaced apart longitudinally of the central element, the external cross section of the end elements conforming to the uniform internal cross section of the first mold member so that when the second mold member is inserted into the first mold member through the open end of the first mold member a mold cavity is formed within the first mold member with the spaced apart end elements of the second mold member defining the ends of the mold cavity, means for introducing material expandable and formable under heat and pressure into the thus formed mold cavity, means for admitting to the mold cavity a medium for subjecting said material to heat and pressure to form in the mold cavity a product having the shape of the mold cavity and means for withdrawing the second mold member with said product from the first mold member through the open end thereof. The central element may be hollow and have transverse holes therein and means may be provided for introducing into the mold cavity through the central element and through the transverse holes therein the medium for subjecting the material in the mold cavity to heat and pressure. The central element may be formed so as to divide the mold cavity into a plurality of isolated portions extending longitudinally of the mold cavity between the end elements with means for introducing the material expandable and formable under heat and pressure into each of the isolated portions of the mold cavity to produce in each such portion a product having the shape thereof.

other details, objects and advantages of the invention will become apparent as the following description of certain present preferred embodiments thereof proceeds.

In the accompanying drawings I have shown certain present preferred embodiments of the invention in which FIG. 1 is a somewhat diagrammatic view, partly in elevation and partly in vertical longitudinal cross section, of one form of molding apparatus in accordance with my invention;

Figure 1:
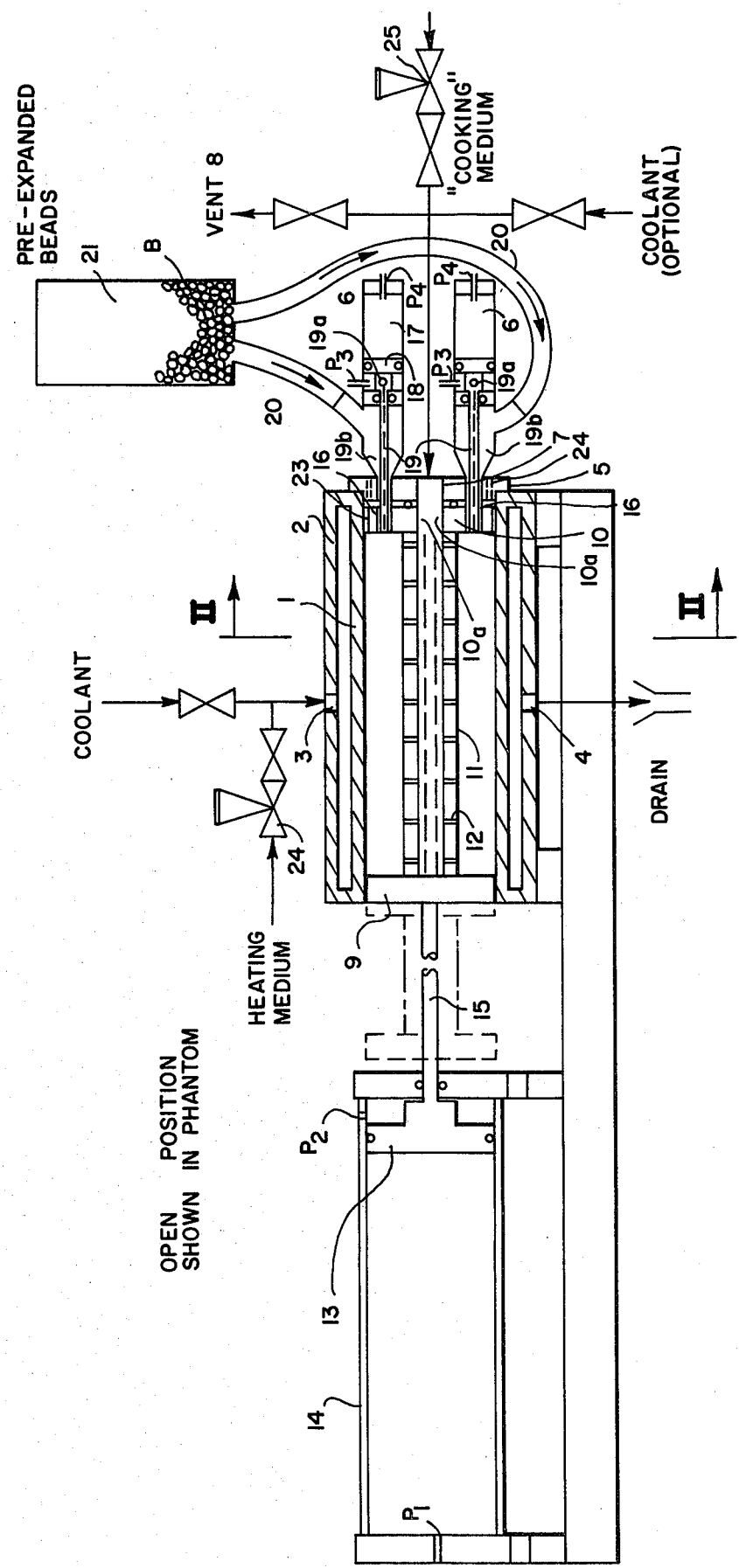
Figure 2:
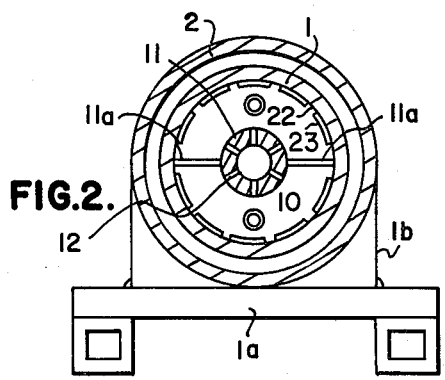
FIG. 2 is a vertical transverse cross-sectional view taken on the line II—II of FIG. 1.
Figure 3:
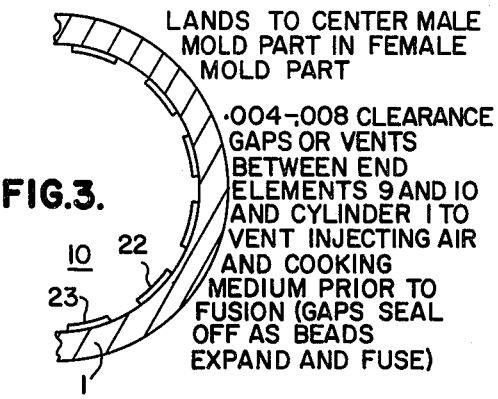
FIG. 3 is an enlarged fragmentary vertical transverse cross-sectional view of a portion of the structure shown in FIG. 2.

Referring now more particularly to the drawings and first to FIGS. 1–3, there is provided a cylinder designated by the numeral 1 which, as will presently be made clear, constitutes the first mold member or female mold part of the molding system, eliminating platens and applied mold parts, locking clamps or holding devices and other positioning and fastening means conventional to molding systems. Surrounding the female mold part 1 is a jacket 2 which in the form shown is integral with the mold part 1. The cylinder 1 and jacket 2 are supported on a base 1a and held down by straps 1b. An inlet 3 is provided for introducing at will a heating medium such as steam and coolant such as water into the jacket 2 to heat and cool the mold part 1 with a drain 4 for draining off the heating medium and coolant. The left hand end of the mold part 1 viewing FIG. 1 is open. The right hand end is closed by a plug 5. The plug 5 carries injector means 6 for injecting pre-expanded beads B into the mold part 1. Also the plug 5 has a central bore 7 for introducing a cooking medium such as steam (and optionally a coolant such as water) into the mold part 1. Air used for injecting the beads B may be vented through a vent 8 and also through gaps or vents between lands on the male mold part as will be presently described.

The second mold member or male mold part consists of two cylindrical end elements 9 and 10 which have a sliding fit within the female mold part 1 and are connected by a hollow stem or central element 11 shown as in the form of a pipe having wings 11a extending outwardly on opposite sides to divide the mold cavity in the female mold part into two isolated portions, one above the wings and one below the wings. The central element or pipe 11 has transverse holes 12 therein. The male mold part is connected by a piston rod 15 with a piston 13 in a drive cylinder 14. By operation of the piston 13 in the drive cylinder 14 the male mold part is moved between its position inside the female mold part 1 as shown in solid lines in FIG. 1 and a withdrawn position as indicated in chain lines in FIG. 1. When the male mold part is disposed within the female mold part as shown in solid lines in FIG. 1 the central element 11 is aligned and communicates with the bore 7 through an opening 10a in the end element 10 so that cooking medium or coolant introduced through the bore 7 enters the central element 11 and passes out through the transverse holes 12 into the interior of the female mold part 1 to cook or expand, or cool, beads therein.

The end element 10 also has bores 16 therethrough which when the male mold part is in place within the female mold part align with upper and lower injector means 6 so that beads B may be injected by the injector means through the plug 5 and through the end piece 10 into the female mold part above and below the wings 11a.

Each of the injector means 6 comprises a cylinder 17 in which operates a piston 18 having a hollow stem 19. Each piston 18 may be moved to the right viewing FIG. 1 by admitting air under pressure through the port $P_3$ in the corresponding cylinder 17 and may be moved to the left by admitting air under pressure through the port $P_4$ in the corresponding cylinder 17. The ports $P_3$ and $P_4$ may also act as exhaust ports when not functioning as inlet ports. Air admitted through the ports $P_3$ passes through openings 19a into the hollow stems 19.

When beads B are to be injected into the mold air under pressure is admitted through the ports $P_3$, moving the pistons 18 to the right in the cylinders 17. Air under pressure passes through the openings 19a and the hollow stems 19 and is released in the constricted portions or throats 19b of the tubes 20 conducting beads B from the supply hopper 21. This forms a venturi effect aspirating beads through the bores 16 into the mold cavity.

When the beads have been injected into the mold cavity the pistons 18 are moved to the left viewing FIG. 1 to the positions shown in that figure, shutting off the aspirating of beads.

The end element 10 has lands 22 seating in the female mold part 1 to center the male mold part in the female mold part and providing gaps or vents 23 through which injecting air may be vented, the air passing through holes in the plug 5 to the outside. The end element 9 may have similar lands providing gaps or vents through which injecting air may be vented to the outside. The lands and gaps or vents in each end element may vary in number, perhaps about twenty, and the depth of the gaps or vents may be of the order of 0.004 - 0.008 inch. Cooking medium as well as injecting air may be vented through the gaps or vents 23. Expansion and fusion of the beads B blocks further exhaust of cooking medium and/or injecting air through the vents 23 and also blocks further passage of cooking medium through the holes 12. Also at the completion of expansion and fusion of the beads B the valves 24 and 25 are closed.

The thermal cycle is conventional as above stated. At the beginning of the cycle the piston 13 in the drive cylinder 14 is moved to the right by introducing fluid under pressure through the port $P_1$, thus introducing the male mold part into the female mold part. Then beads are injected into the mold cavity as above described whereafter a heating medium such as steam is introduced through the inlet 3 into the jacket 2. Also a cooking medium such as steam is introduced through the bore 7 and the opening 10a. The cooking medium passes through the central element 11 and through the holes 12 to cook or expand the beads which fill the space between the mold parts. As above stated, the fusion of the beads blocks further entry of cooking medium and further venting through the gaps 23. The beads are expanded and consolidated under pressure to form the product being produced. No special means need be provided to counteract the pressure caused by the expansion of the beads in the mold since the pressure is equal against both end elements 9 and 10. Thus there is provided a very simple, effective and inexpensive structure for confining the expandable material during formation of the product without the use of platens and applied mold parts, locking clamps or holding devices and other positioning and fastening means conventional to molding systems.

When the molding is completed the heating medium in the jacket 2 is drained out through the drain 4 and coolant is introduced through the inlet 3 into the jacket to cool the product. The cooking medium in the central element 11 is vented through the bore 7 and the vent 8 and if desired coolant may be introduced into the central element 11 although this would not normally be done. After the product has been cooled the piston 13 in the cylinder 14 is moved to the left by introducing fluid under pressure through the port $P_2$ withdrawing the male mold part and the molded product from within the female mold part. The product formed in the lower half of the molding apparatus may drop out and the product formed in the upper half of the molding apparatus may be lifted out.

Suitable pipes and valving as readily understood by those skilled in the art are provided for introducing and draining off or venting the fluids employed.

A primary feature of the structure shown is the female mold part constituted by the cylinder 1 with the male mold part constituted by the end elements 9 and 10 and the central element 11 slidable into the female mold part and slidable out of the female mold part carrying the finished product.

Figure 4:
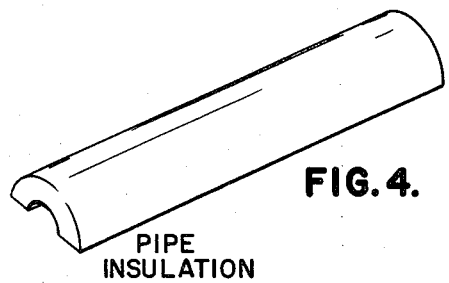
FIG. 4 is a perspective view of a length of pipe insulation which may be produced on the apparatus of FIGS. 1–3.
Figure 5:
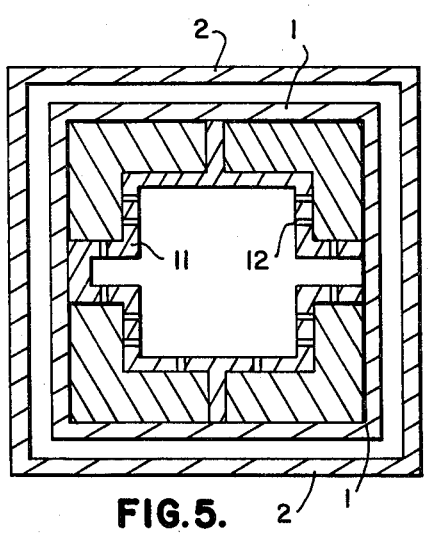
FIG. 5 is a vertical transverse cross-sectional view similar to the upper portion of FIG. 2 of a second form of molding apparatus in accordance with my invention.
Figure 6:
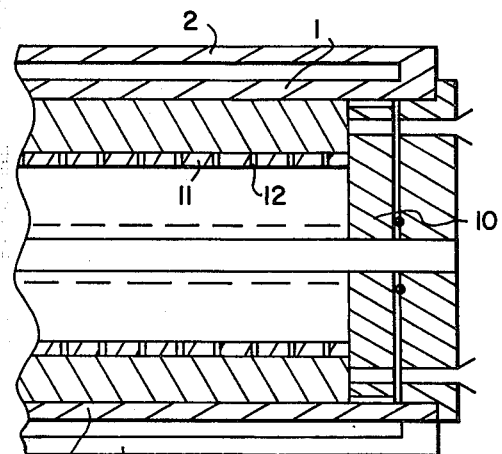
FIG. 6 is a fragmentary vertical longitudinal cross-sectional view similar to a portion of FIG. 1 of the second form of molding apparatus shown in FIG. 5.
Figure 7:
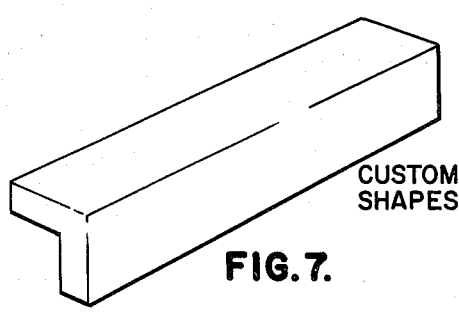
FIG. 7 is a perspective view of an angle shape which may be produced on the apparatus of FIGS. 5 and 6.
Figure 8:
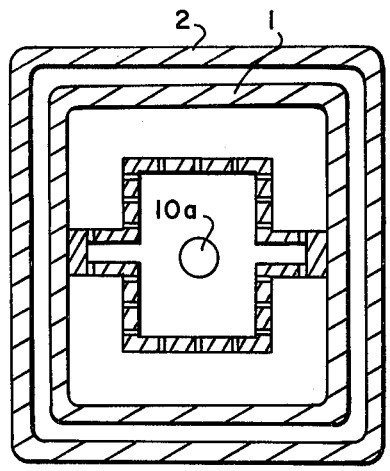
FIG. 8 is a view similar to FIG. 5 of a third form of molding apparatus in accordance with my invention.
Figure 9:
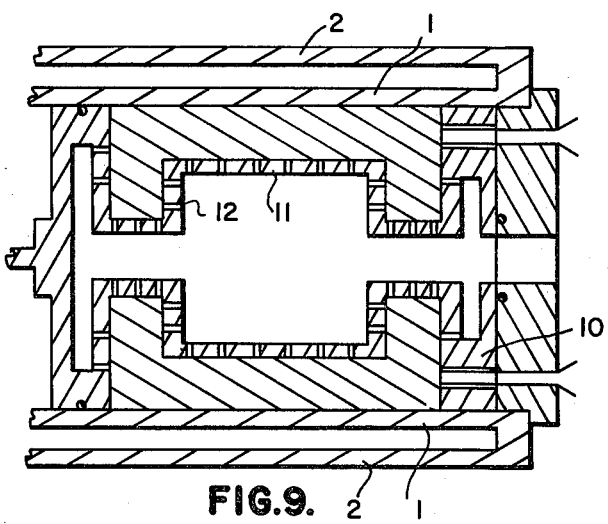
FIG. 9 is a view similar to FIG. 6 of the third form of molding apparatus shown in FIG. 8.
Figure 10:
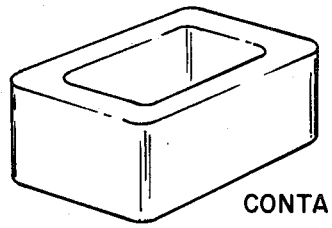
FIG. 10 is a perspective view of a container which may be produced on the apparatus of FIGS. 8 and 9.
Figure 11:
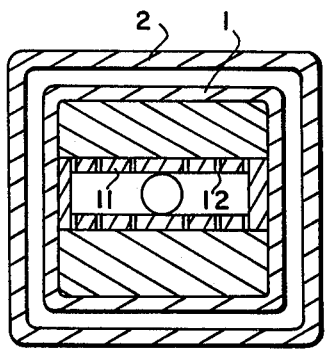
FIG. 11 is a view similar to FIG. 5 of a fourth form of molding apparatus in accordance with my invention.
Figure 12:
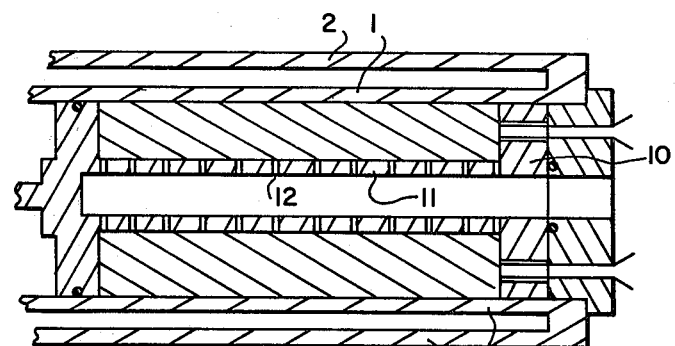
FIG. 12 is a view similar to FIG. 6 of the fourth form of molding apparatus shown in FIG. 11.
Figure 13:
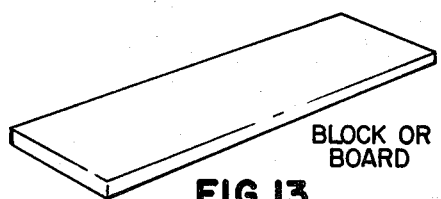
FIG. 13 is a perspective view of a block or board which may be produced on the apparatus of FIGS. 11 and 12.

FIG. 4 shows a length of pipe insulation such as may be formed in both the upper and lower portions of the molding apparatus of FIGS. 1-3. FIGS. 5 and 6 show a second form of molding apparatus constructed and functioning analogously to the molding apparatus of FIGS. 1-3 for forming four angle shapes as shown in FIG. 7. FIGS. 8 and 9 show a third form of molding apparatus for forming containers as shown in FIG. 10. FIGS. 11 and 12 show a fourth form of molding apparatus for forming two blocks or boards as shown in FIG. 13.

While I have shown and described certain present preferred embodiments of the invention it is to be distinctly understood that the invention is not limited thereto but may be otherwise variously embodied within the scope of the following claims.

I claim:

1. Apparatus for molding beads expandable and formable under heat and pressure comprising a container for such beads, a first mold member which is hollow and open at one end and of uniform internal cross section along an axis perpendicular to the open end, a second mold member comprising a central element and end elements connected with the central element and spaced apart longitudinally of the central element, the external cross section of the end elements conforming to the uniform internal cross section of the first mold member so that when the second mold member is inserted into the first mold member through the open end of the first mold member a mold cavity is formed within the first mold member with the spaced apart end elements of the second mold member defining the ends of the mold cavity, means for conveying said beads from said container into the thus formed mold cavity, means for admitting to the mold cavity a medium for subjecting said beads to heat and pressure to form in the mold cavity a product having the finished final shape and size of the mold cavity and means for withdrawing the second mold member with said product from the first mold member through the open end thereof.

2. Apparatus as claimed in claim 1 in which the central element is hollow and has transverse holes therein together with means for introducing into the mold cavity through the central element and through the transverse holes therein said medium for subjecting said beads in the mold cavity to heat and pressure.

3. Apparatus as claimed in claim 2 in which the central element divides the mold cavity into a plurality of isolated portions extending longitudinally of the mold cavity between the end elements and said conveying means conveying said beads from said container into each of the isolated portions of the mold cavity to produce in each such isolated portion of the mold cavity a product having the shape of such isolated portion of the mold cavity.

4. Apparatus as claimed in claim 1 including a jacket surrounding the first mold member and means for introducing a heating medium into the jacket.

5. Apparatus as claimed in claim 4 in which the jacket is integral with the first mold member.

6. Apparatus as claimed in claim 1 in which vents are provided between the first mold member and at least one of the end elements of the second mold member for venting to the outside said medium.

7. Apparatus as claimed in claim 3 in which the central element of the second mold member is a pipe having wings extending outwardly on opposite sides to divide the mold cavity into said plurality of isolated portions.

8. Apparatus as claimed in claim 3 in which the central element of the second mold member is shaped to divide the mold cavity into more than two isolated portions.

* * * * *

UNITED STATES PATENT OFFICE
CERTIFICATE OF CORRECTION

Patent No. 3,912,430        Dated October 14, 1975

Inventor(s) JOHN A. NOEL

It is certified that error appears in the above-identified patent and that said Letters Patent are hereby corrected as shown below:

In the heading, following the name and address of the inventor, insert --Assignees: Undivided one-fourth to each of Lyle H. Wharton and Donald C. Wishart, both of Phoenix, Arizona.

Column 1, line 8, after "boxes" place a comma; line 64, change "other" to --Other--.

Signed and Sealed this eighth Day of June 1976

[SEAL]

*Attest:*

RUTH C. MASON        C. MARSHALL DANN
*Attesting Officer*        *Commissioner of Patents and Trademarks*